(12) United States Patent
Zhang et al.

(10) Patent No.: US 10,064,101 B2
(45) Date of Patent: Aug. 28, 2018

(54) VOIP DATA TRANSMISSION METHOD AND BASE STATION

(71) Applicant: Yulong Computer Telecommunication Scientific (Shenzhen) Co., Ltd., Shenzhen, Guangdong (CN)

(72) Inventors: Chenlu Zhang, Guangdong (CN); Xiandong Dong, Guangdong (CN)

(73) Assignee: Yulong Computer Telecommunication Scientific (Shenzhen) Co., Ltd., Shenzhen, Guangdong (CN)

(*) Notice: Subject to any disclaimer, the term of this patent is extended or adjusted under 35 U.S.C. 154(b) by 116 days.

(21) Appl. No.: 15/030,423

(22) PCT Filed: Nov. 1, 2013

(86) PCT No.: PCT/CN2013/086471
§ 371 (c)(1),
(2) Date: Apr. 19, 2016

(87) PCT Pub. No.: WO2015/062099
PCT Pub. Date: May 7, 2015

(65) Prior Publication Data
US 2016/0286435 A1    Sep. 29, 2016

(51) Int. Cl.
*H04L 12/26*    (2006.01)
*H04W 28/18*    (2009.01)
(Continued)

(52) U.S. Cl.
CPC .......... *H04W 28/18* (2013.01); *H04L 1/1812* (2013.01); *H04L 5/0055* (2013.01);
(Continued)

(58) Field of Classification Search
CPC ..... H04W 28/18; H04W 4/001; H04W 24/10; H04W 72/0446; H04W 72/1263;
(Continued)

(56) References Cited

U.S. PATENT DOCUMENTS

| 9,667,400 B2* | 5/2017 | Wu ........................ H04L 5/0055 |
| 2010/0042884 A1* | 2/2010 | Kuo ....................... H04L 1/1887 714/748 |

(Continued)

FOREIGN PATENT DOCUMENTS

| CN | 101594650 A | 12/2009 |
| CN | 101651601 A | 2/2010 |
| CN | 101772175 A | 7/2010 |
| WO | 2013142410 A2 | 9/2013 |

*Primary Examiner* — Thai Hoang
(74) *Attorney, Agent, or Firm* — Young Basile Hanlon & MacFarlane, P.C.

(57) ABSTRACT

The present disclosure proposes a VoIP data transmission method, comprising: when a VoIP communication request corresponding to any terminal is received, determining whether currently adopted uplink and downlink configuration information supports the terminal in performing TTI bundling operation according to preset bundling configuration parameters when it is determined that the terminal is required to perform the TTI bundling operation on generated VoIP data package; and when not supporting, sending the preset bundling configuration parameters and new uplink and downlink configuration information to the terminal, wherein the new uplink and downlink configuration information supports the terminal in performing the TTI bundling operation according to the preset bundling configuration parameters.

20 Claims, 8 Drawing Sheets

(51) Int. Cl.
  *H04W 76/00*   (2018.01)
  *H04W 80/00*   (2009.01)
  *H04L 1/18*    (2006.01)
  *H04L 5/00*    (2006.01)
  *H04W 24/10*   (2009.01)
  *H04W 72/04*   (2009.01)
  *H04W 72/12*   (2009.01)
  *H04W 4/50*    (2018.01)

(52) U.S. Cl.
  CPC ............. *H04L 5/0057* (2013.01); *H04W 4/50* (2018.02); *H04W 24/10* (2013.01); *H04W 72/0446* (2013.01); *H04W 72/1263* (2013.01); *H04W 76/00* (2013.01); *H04W 80/00* (2013.01)

(58) Field of Classification Search
  CPC .... H04W 76/00; H04W 80/00; H04L 1/1812; H04L 5/0055; H04L 5/0057
  USPC ............. 370/352–356, 254, 465–470
  See application file for complete search history.

(56) References Cited

U.S. PATENT DOCUMENTS

| | | | |
|---|---|---|---|
| 2010/0169732 A1* | 7/2010 | Wu ............... | H04L 1/1822 714/748 |
| 2011/0149925 A1* | 6/2011 | Olsson ........... | H04W 36/0022 370/337 |
| 2013/0272281 A1* | 10/2013 | Xu ................ | H04L 1/1812 370/336 |
| 2014/0161111 A1* | 6/2014 | Kim ............... | H04W 56/0005 370/336 |
| 2014/0286240 A1* | 9/2014 | Kim ............... | H04W 56/0005 370/328 |
| 2014/0362832 A1* | 12/2014 | Rudolf ............ | H04L 1/1822 370/336 |
| 2015/0071209 A1* | 3/2015 | Chae .............. | H04L 1/1887 370/329 |
| 2015/0180619 A1* | 6/2015 | Majjigi ........... | H04L 5/0005 370/330 |
| 2016/0164643 A1* | 6/2016 | Loehr ............. | H04L 1/1854 370/336 |

* cited by examiner

VOIP DATA TRANSMISSION METHOD AND BASE STATION

CROSS REFERENCE TO RELATED APPLICATION

The present application is a U.S. national stage of international patent application PCT/CN2013/086471, filed on Nov. 1, 2013, the content of which is incorporated herein by reference in its entirety.

FIELD OF THE TECHNICAL

The present invention relates to technical field of communication, and particularly, relates to a VoIP data transmission method and a base station.

BACKGROUND

In the Rel-12 Standard Edition of 3GPP, research on an issue of uplink coverage enhancement was performed, and the purpose was to further enlarge coverage area. That is to say, a UE (User Equipment) is enabled to send within larger cell coverage area, and it is ensured that UL signal received by a base station has sufficient reception SINR (Signal to Interference and Noise Ratio).

For operators in China, for example, China Telecom, its communication network is a CDMA network, and is disposed mostly at 800 MHz frequency. This frequency has good transmission performance, small attenuation, and the intervals between base stations are larger. Moreover, in future, China Telecom will dispose TD-LTE network at 2 GHz. But due to less station site, it is contemplated that initially co-site (a base station of TD-LTE network and a base station of CDMA network are installed on an identical site) disposal is primary, specifically as shown in FIG. 1.

However, due to difference of transmitting performance, as shown in FIG. 1, a base station 102 comprises a base station of CDMA network and a base station of TD-LTE network. The TD-LTE network of 2 GHz is corresponding to coverage area 1, and the CDMA network of 800 MHz is corresponding to coverage area 2, and then the annular dead zone 3 will be generated there between. In this annular region, quality of channel corresponding to a UE (terminal 104 as shown in FIG. 1) is low. Taking SINR as an example, the reception SINR value after signal sent by the UE arrives the base station will be lower than expected, and even lower than the threshold value that can be correctly received, namely the uplink signal sent by the UE cannot be correctly received by BS (Base Station).

Based on the foregoing description, due to excessive UE path loss at the edge of TD-LTE cell, uplink VoIP (Voice over Internet Protocol) data sent by the UE are difficult to be correctly received by the BS at constant transmission power, such that VoIP communication could not be normally completed. Rel-8 LTE, in order to solve this problem, proposed a method of TTI (Transmission Time Interval) bundling. In this method, multiple sequent TTI is bundled together and sent, and the reception SINR of the base station and correctly receiving probability of the base station is increased by sending increased redundancy and reducing coding rate.

However, for TDD (Time Division Duplex) communication system, in uplink and downlink configuration information as shown in FIG. 2, special sub-frames 202, uplink sub-frames 204 and downlink sub-frames 206 corresponding to different uplink and downlink configuration information differ in quantity, so as to meet different service requirements of TDD-LTE system. For example, in a cycle of 10 ms, configuration 0 comprises 6 uplink sub-frames 204, and configuration 5 merely comprises 1. Although, at present, in Rel-8, in order to simplify solution and retain consistent with FDD (Frequency Division Duplex) solution, TDD adopted a mode of 4-TTI bundling. But, in fact, on the one hand, TTI bundling quantity may obviously be other numbers, and on the other hand, no matter what the TTI bundling quantity is (not more than maximum quantity of the uplink sub-frames in one cycle, such as 6 uplink sub-frames corresponding to configuration 0), there is always the uplink and downlink configuration information (such as configuration 5) which can and cannot support TTI bundling.

Therefore, how to ensure the UE is capable of improving communication quality by TTI bundling when adopting different uplink and downlink configuration information becomes a technical problem to be solved currently.

SUMMARY

The present invention is addressed to the above-mentioned problems, and proposes a new technical solution which, by dynamically adjusting uplink and downlink configuration information in the case that the TTI bundling is required to be performed and the currently adopted uplink and downlink configuration information does not support the TTI bundling, may ensure that the terminal could perform the TTI bundling operation so as to contribute to improving the VoIP communication quality for users at cell edge.

In view of this, the present invention proposes a VoIP data transmission method, comprising: when a VoIP communication request corresponding to any terminal is received, judging whether currently adopted uplink and downlink configuration information supports the terminal in performing TTI bundling operation according to preset bundling configuration parameters if it is determined that the terminal is required to perform the TTI bundling operation on generated VoIP data package; and if the currently adopted uplink and downlink configuration information does not support the terminal in performing the TTI bundling operation according to preset bundling configuration parameters, sending the preset bundling configuration parameters and new uplink and downlink configuration information to the terminal, wherein the new uplink and downlink configuration information supports the terminal in performing the TTI bundling operation according to the preset bundling configuration parameters.

In this technical solution, by judging the support situation of the preset bundling configuration parameters by the currently adopted uplink and downlink configuration information, and when not supporting, changing it into the new uplink and downlink configuration information, the terminal is enabled to perform the TTI bundling operation when applying this new uplink and downlink configuration information, so as to ensure that the VoIP data package can be received smoothly and VoIP communication process is completed.

The preset bundling configuration parameters are the parameters for configuring the TTI bundling operation, such as parameters included in communication standard and implemented by base stations and terminals.

In the above-mentioned technical solution, preferably, the VoIP communication request is from a wireless mobile communication network, or initiated by the terminal.

In this technical solution, for the VoIP communication request from the wireless mobile communication network, namely the call request from other terminals, the wireless mobile communication network is required to initiate the call request to the terminal; for the VoIP communication request initiated by this terminal, the terminal is required to initiate the call request to other terminals. For any communication request, by changing the uplink and downlink configuration information, the terminal is enabled to improve data transmission quality in the VoIP communication process smoothly by the TTI bundling operation.

In any one of the above-mentioned technical solutions, preferably, the preset bundling configuration parameters include TTI bundling quantity, and the VoIP data transmission method comprises determining the currently adopted uplink and downlink configuration information supports the terminal in performing the TTI bundling operation according to the preset bundling configuration parameters if quantity of uplink sub-frames included in a single cycle corresponding to the currently adopted uplink and downlink configuration information is greater than or equal to the TTI bundling quantity, otherwise determining not supporting.

In this technical solution, it is possible to, by presetting the TTI bundling quantity, judge whether it is necessary to change the uplink and downlink configuration information based on whether each kind of the uplink and downlink configuration information supports this TTI bundling quantity. Specifically, each kind of the uplink and downlink configuration information is within a cycle of 10 ms, and the quantity of included uplink sub-frames is constant, and thus it is ensured that the TTI bundling operation can be completed in the case of this TTI bundling quantity, as long as the quantity of uplink sub-frames is greater than or equal to the TTI bundling quantity.

For example, when the bundling quantity is 4, only the configurations 0, 1 and 6 could support the TTI bundling operation; when the bundling quantity is 3, in addition to the configurations 0, 1, 6, the configuration 3 could also support; when the bundling quantity is 2, only the configuration 5 could not support.

In any one of the above-mentioned technical solutions, preferably, the TTI bundling quantity is one bundling number, indicating that the terminal utilizes this bundling number to perform the bundling operation on the VoIP data package; or the TTI bundling quantity is a bundling number group consisting of multiple bundling numbers, indicating that the terminal divides all the TTIs in the VoIP data package into multiple TTI groups according to the bundling number group, each TTI bundling number in the bundling number group being corresponding to at least one of the multiple TTI groups, the quantity of TTIs included in each of the multiple TTI groups being equal to the corresponding TTI bundling number.

In this technical solution, in the case of including only one bundling number, this bundling number may be any number of 2-6, and specific TTI bundling operation can be performed with reference to the regulation in current Rel-8 standard agreement regarding the TTI bundling operation in the case that the bundling quantity is 4.

In the case of including multiple bundling numbers, all these multiple bundling numbers meet the requirement of being less than the quantity of uplink sub-frames included in the uplink and downlink configuration information within a cycle of 10 ms. For these multiple bundling numbers, the TTIs in each VoIP data package are multiple, and thus when these TTIs are divided into groups and packaged, the quantity and the arrangement position of the TTI group corresponding to each bundling number may be realized in multiple ways.

For example, in the case of the number group {2, 3}, assuming that there are 20 TTIs in total, in one kind of mode, it is possible to be bundled into 7 TTI groups, one of the TTI groups including 2 TTIs, the remaining 6 TTI groups including 3 TTIs each; in another kind of mode, it is possible to be bundled into 8 TTI groups, 4 of the TTI groups including 2 TTIs each, the remaining 4 TTI groups including 3 TTIs each; in yet another kind of mode, it is possible to be bundled into 9 TTI groups, 7 of the TTI groups including 2 TTIs each, the remaining 2 TTI groups including 3 TTIs each.

Moreover, with regard to the above-mentioned each kind of grouping, there are also multiple situations among the arrangement sequence of multiple TTI groups. For example, taking the above-mentioned 7 TTI groups in total as an example, the TTI group including 2 TTIs and the remaining 6 TTI groups may constitute 7 kinds of different combination modes, such as (2, 3, 3, 3, 3, 3, 3), (3, 2, 3, 3, 3, 3, 3), (3, 3, 2, 3, 3, 3, 3), (3, 3, 3, 2, 3, 3, 3), (3, 3, 3, 3, 2, 3, 3), (3, 3, 3, 3, 3, 2, 3), (3, 3, 3, 3, 3, 3, 2) etc.

Therefore, in the case of including multiple bundling numbers, it is possible to determine which specific kind of combination mode to use by bringing it into the communication standard in advance or making an agreement between the terminal and the base station, so as to perform smoothly when implementing practically. Certainly, the terminal may also directly generate a group of random numbers from these multiple bundling numbers, and perform the bundling operation on the TTI in the VoIP data package according to this group of random numbers.

In any one of the above-mentioned technical solutions, preferably, the generating cycle length of the VoIP data package is corresponding to multiple cycles of the currently adopted uplink and downlink configuration information, and the quantity of all the uplink sub-frames included in the multiple cycles is greater than or equal to the quantity of all the TTIs in the VoIP data package.

In this technical solution, as the VoIP data package has corresponding generating cycle, for example 20 ms, this time section is corresponding within multiple cycles of the uplink and downlink configuration information, and sufficient quantity of uplink sub-frames ought to be included, to avoid the collision between multiple packages generated in the same VoIP process operated in the terminal.

In any one of the above-mentioned technical solutions, preferably, the preset bundling configuration parameters further include Round Trip Time and/or HARQ (Hybrid Automatic Repeat Request) sequence. The Round Trip Time (RTT) refers to the repeating cycle corresponding to the each VoIP data package, and the HARQ sequence refers to ACK feedback sub-frame corresponding to the each data package, or NACK feedback sub-frame and retransmitted sub-frame number corresponding to the each data package.

Certainly, the RTT and/or the HARQ sequence may be added in a certain signaling, and sent together with the TTI bundling number, or they may also be sent separately by other signalings, for example, the RTT being sent by signaling 1, and the HARQ sequence being sent by signaling 2, or the RTT and the HARQ sequence together being sent by signaling 3.

In any one of the above-mentioned technical solutions, it is preferable to further comprise: obtaining channel quality parameter corresponding to the terminal; and determining that the terminal is required to perform the TTI bundling operation on the VoIP data, if the value of the channel quality parameter is less than or equal to preset parameter threshold.

In this technical solution, by obtaining the channel quality (indicated by value of the channel quality parameter) corresponding to the terminal, it may be determined that the TTI bundling operation is required to be performed so as to ensure the smooth performance of the VoIP communications, when this channel quality is relatively worse (manifesting that the value of the channel quality parameter is less than or equal to the preset parameter threshold).

In any one of the above-mentioned technical solutions, preferably, the process of obtaining the channel quality parameter corresponding to the terminal comprises measuring reference signal sent by the terminal so as to obtain the channel quality parameter; or receiving downlink measuring report uploaded by the terminal, and obtaining the channel quality parameter from the downlink measuring report.

In this technical solution, two detailed described methods of obtaining the channel quality parameter are provided, however, persons skilled in the art should understand that, it is only illustration herein, and apparently obtaining the channel quality is not limited to these two above methods.

In any one of the above-mentioned technical solutions, it is preferable to further comprise estimating whether the changed value of the channel quality parameter meets the requirement of being greater than the preset parameter threshold after performing the TTI bundling operation according to the preset bundling configuration parameter, if the currently adopted uplink and downlink configuration information supports the TTI bundling operation performed by the terminal according to the preset bundling configuration parameters; if not meeting, sending the preset bundling configuration parameters and the new uplink and downlink configuration information to the terminal.

In this technical solution, in the case that the uplink and downlink configuration information supports the preset bundling configuration parameters, for example, the preset bundling configuration parameter being 2, and the currently adopted uplink and downlink configuration information being configuration 2, although the TTI bundling operation can be performed, the gain brought thereby does not necessarily enable the terminal to complete the VoIP communication smoothly. Therefore, by estimating the situation after the TTI bundling operation is completed, it is possible to truly ensure that the sufficient gain could be brought for the terminal after the TTI bundling operation is completed, so as to improve the channel quality and complete the VoIP communication smoothly.

In any one of the above-mentioned technical solutions, it is preferable to, before sending the preset bundling configuration parameters and the new uplink and downlink configuration information to the terminal, further comprise choosing an uplink and downlink configuration information which is different from the currently adopted uplink and downlink configuration information; and estimating whether the changed value of the channel quality parameter meets the requirement of being greater than the preset parameter threshold after the terminal performs the TTI bundling operation according to the preset bundling configuration parameters, when the chosen uplink and downlink configuration information is applied; if meeting, regarding the chosen uplink and downlink configuration information as the new uplink and downlink configuration information, otherwise performing the choosing operation again.

In this technical solution, because after performing the TTI bundling operation, the gain sufficient for the terminal to complete the VoIP communication smoothly may not be definitely brought, by estimating the channel quality corresponding to the currently chosen uplink and downlink configuration information, suitable uplink and downlink configuration information can be chosen, such that after the TTI bundling operation is completed, it is possible to truly ensure that sufficient gain is brought for the terminal, to improve the channel quality and complete the VoIP communication smoothly.

The present invention further proposes a base station, comprising: an information judging unit, for judging whether currently adopted uplink and downlink configuration information supports a terminal in performing TTI bundling operation according to preset bundling configuration parameters if determining the terminal is required to perform the TTI bundling operation on generated VoIP data package, in the case of receiving VoIP communication request corresponding to any terminal; and an information sending unit, for sending the preset bundling configuration parameters and new uplink and downlink configuration information to the terminal in the case of determining that the currently adopted uplink and downlink configuration information does not support the terminal in performing the TTI bundling operation according to the preset bundling configuration parameters, wherein the new uplink and downlink configuration information supports the terminal in performing the TTI bundling operation according to the preset bundling configuration parameters.

In this technical solution, by judging the situation of supporting the preset bundling configuration parameters by the currently adopted uplink and downlink configuration information, and when not supporting, changing it into the new uplink and downlink configuration information, the terminal is enabled to perform the TTI bundling operation when applying this new uplink and downlink configuration information, so as to ensure that the VoIP data package can be received smoothly and the VoIP communication process is completed.

The preset bundling configuration parameters are the parameters for configuring the TTI bundling operation, such as parameters included in communication standard and implemented by base stations and terminals.

In the above-mentioned technical solution, preferably, the VoIP communication request is from the wireless mobile communication network, or initiated by the terminal.

In this technical solution, for the VoIP communication request from the wireless mobile communication network, namely the call request from other terminals, the wireless mobile communication network is required to initiate the call request to the terminal; for the VoIP communication request initiated by this terminal, the terminal is required to initiate the call request to other terminals. For any communication request, by changing the uplink and downlink configuration information, the terminal is enabled to improve the data transmission quality in the VoIP communication process smoothly by the TTI bundling operation.

In any one of the above-mentioned technical solutions, preferably, the preset bundling configuration parameters include the TTI bundling quantity, and the information judging unit is for determining the currently adopted uplink and downlink configuration information supports the terminal in performing the TTI bundling operation according to the preset bundling configuration parameters in the case that the quantity of uplink sub-frames included in a single cycle corresponding to the currently adopted uplink and downlink configuration information is greater than or equal to the TTI bundling quantity, otherwise determining not supporting.

In this technical solution, it is possible to, by presetting the TTI bundling quantity, judge whether it is necessary to change the uplink and downlink configuration information based on whether each kind of the uplink and downlink configuration information supports this TTI bundling quantity. Specifically, each kind of the uplink and downlink configuration information is within a cycle of 10 ms, and the quantity of included uplink sub-frames is constant, and thus as long as the quantity of uplink sub-frames is more than or equal to the TTI bundling quantity, it is ensured that the TTI bundling operation can be completed in the case of this TTI bundling quantity.

For example, when the bundling quantity is 4, only the configurations 0, 1 and 6 could support the TTI bundling operation; when the bundling quantity is 3, in addition to the configurations 0, 1, 6, the configuration 3 could also support; when the bundling quantity is 2, only the configuration 5 could not support.

In any one of the above-mentioned technical solutions, preferably, the TTI bundling quantity is one bundling number, indicating that the terminal utilizes this bundling number to perform the bundling operation on the VoIP data package; or the TTI bundling quantity is a bundling number group consisting of multiple bundling numbers, indicating that the terminal divides all the TTIs in the VoIP data package into multiple TTI groups according to the bundling number group, each TTI bundling number in the bundling number group being corresponding to at least one of the multiple TTI groups, the quantity of TTIs included in each of the multiple TTI groups being equal to the corresponding TTI bundling number.

In this technical solution, in the case of including only one bundling number, this bundling number may be any number of 2-6, and specific TTI bundling operation can be performed with reference to the regulation in current Rel-8 standard agreement regarding the TTI bundling operation in the case that the bundling quantity is 4.

In the case of including multiple bundling numbers, all these multiple bundling numbers meet the requirement of being less than the quantity of uplink sub-frames included in the uplink and downlink configuration information within a cycle of 10 ms. For these multiple bundling numbers, the TTIs in each VoIP data package are multiple, and thus when these TTIs are divided into groups and packaged, the quantity and the arrangement position of the TTI group corresponding to each bundling number may be realized in multiple ways.

For example, in the case of the number group {2, 3}, assuming that there are 20 TTIs in total, in one kind of mode, it is possible to be bundled into 7 TTI groups, one of the TTI groups including 2 TTIs, the remaining 6 TTI groups including 3 TTIs each; in another kind of mode, it is possible to be bundled into 8 TTI groups, 4 of the TTI groups including 2 TTIs each, the remaining 4 TTI groups including 3 TTIs each; in yet another kind of mode, it is possible to be bundled into 9 TTI groups, 7 of the TTI groups including 2 TTIs each, the remaining 2 TTI groups including 3 TTIs each.

Moreover, with regard to the above-mentioned each kind of grouping, there are also multiple situations among the arrangement sequence of multiple TTI groups. For example, taking the above-mentioned 7 TTI groups in total as an example, the TTI group including 2 TTIs and the remaining 6 TTI groups may constitute 7 kinds of different combination modes, such as (2, 3, 3, 3, 3, 3, 3), (3, 2, 3, 3, 3, 3, 3), (3, 3, 2, 3, 3, 3, 3), (3, 3, 3, 2, 3, 3, 3), (3, 3, 3, 3, 2, 3, 3), (3, 3, 3, 3, 3, 2, 3), (3, 3, 3, 3, 3, 3, 2) etc.

Therefore, in the case of including multiple bundling numbers, it is possible to determine which specific kind of combination mode to use by bringing it into the communication standard in advance or making an agreement between the terminal and the base station, so as to perform smoothly when implementing practically. Certainly, the terminal may also directly generate a group of random numbers from these multiple bundling numbers, and perform the bundling operation on the TTI in the VoIP data package according to this group of random numbers.

In any one of the above-mentioned technical solutions, preferably, the generating cycle length of the VoIP data package is corresponding to multiple cycles of the currently adopted uplink and downlink configuration information, and the quantity of all the uplink sub-frames included in the multiple cycles is greater than or equal to the quantity of all the TTIs in the VoIP data package.

In this technical solution, as the VoIP data package has corresponding generating cycle, for example 20 ms, this time section is corresponding within multiple cycles of the uplink and downlink configuration information, and sufficient quantity of uplink sub-frames ought to be included, to avoid the collision between multiple packages generated in the same VoIP process operated in the terminal.

In any one of the above-mentioned technical solutions, preferably, the preset bundling configuration parameters further include Round Trip Time and/or HARQ (Hybrid Automatic Repeat Request) sequence. The Round Trip Time (RTT) refers to the repeating cycle corresponding to the each VoIP data package, and the HARQ sequence refers to ACK feedback sub-frame corresponding to the each data package, or NACK feedback sub-frame and retransmitted sub-frame number corresponding to the each data package.

Certainly, the RTT and/or the HARQ sequence may be added in a certain signaling, and sent together with the TTI bundling number, or they may also be sent separately by other signalings, for example, the RTT being sent by signaling 1, and the HARQ sequence being sent by signaling 2, or the RTT and the HARQ sequence together being sent by signaling 3.

In any one of the above-mentioned technical solutions, it is preferable to further comprise a parameter obtaining unit for obtaining channel quality parameter corresponding to the terminal, wherein the information judging unit determines that the terminal is required to perform the TTI bundling operation on the VoIP data, if the value of the channel quality parameter is less than or equal to preset parameter threshold.

In this technical solution, by obtaining the channel quality (indicated by the value of the channel quality parameter) corresponding to the terminal, it may be determined that the TTI bundling operation is required to be performed so as to ensure the smooth performance of the VoIP communications, when this channel quality is relatively worse (manifesting that the value of the channel quality parameter is less than or equal to the preset parameter threshold).

In any one of the above-mentioned technical solutions, preferably, the parameter obtaining unit is for measuring reference signal sent by the terminal so as to obtain the channel quality parameter; or receiving downlink measuring report uploaded by the terminal, and obtaining the channel quality parameter from the downlink measuring report.

In this technical solution, two detailed described methods of obtaining the channel quality parameter are provided, however, persons skilled in the art should understand that, it is only illustration herein, and apparently obtaining the channel quality is not limited to these two above methods.

In any one of the above-mentioned technical solutions, it is preferable to further comprise a quality estimating unit for estimating whether the changed value of the channel quality parameter meets the requirement of being greater than the preset parameter threshold after the terminal performs the TTI bundling operation according to the preset bundling configuration parameter, if the currently adopted uplink and downlink configuration information supports the TTI bundling operation performed according to the preset bundling configuration parameters, wherein if the estimation result is not meeting, the information sending unit sends the preset bundling configuration parameters and the new uplink and downlink configuration information to the terminal.

In this technical solution, in the case that the uplink and downlink configuration information supports the preset bundling configuration parameters, for example, the preset bundling configuration parameter being 2, and the currently adopted uplink and downlink configuration information being the configuration 2, although the TTI bundling operation can be performed, the gain brought thereby does not necessarily enable the terminal to complete the VoIP communication smoothly. Therefore, by estimating the situation after the TTI bundling operation is completed, it is possible to truly ensure that the sufficient gain could be brought for the terminal after the TTI bundling operation is completed, so as to improve the channel quality and complete the VoIP communication smoothly.

In any one of the above-mentioned technical solutions, it is preferable to further comprise an information choosing unit for, before sending the preset bundling configuration parameters and the new uplink and downlink configuration information to the terminal, choosing an uplink and downlink configuration information which is different from the currently adopted uplink and downlink configuration information; and a quality estimating unit for estimating whether the changed value of the channel quality parameter meets the requirement of being greater than the preset parameter threshold after the terminal performs the TTI bundling operation according to the preset bundling configuration parameters, when the chosen uplink and downlink configuration information is applied, wherein if the estimation result is meeting, the information choosing unit regards the chosen uplink and downlink configuration information as the new uplink and downlink configuration information, otherwise performs the choosing operation again.

In this technical solution, because after performing the TTI bundling operation, the gain sufficient for the terminal to complete the VoIP communication smoothly may not be definitely brought, by estimating the channel quality corresponding to the currently chosen uplink and downlink configuration information, suitable uplink and downlink configuration information can be chosen, such that after the TTI bundling operation is completed, it is possible to truly ensure that sufficient gain is brought for the terminal, to improve the channel quality and complete the VoIP communication smoothly.

According to the above-mentioned technical solution, it is possible to, by dynamically adjusting the uplink and downlink configuration information in the case that the TTI bundling is required to be performed and the currently adopted uplink and downlink configuration information does not support the TTI bundling, ensure that the terminal could perform the TTI bundling operation so as to contribute to improving the VoIP communication quality for users at cell edge.

DETAILED DESCRIPTION OF ILLUSTRATED EMBODIMENTS

In order to more fully understand above-mentioned purposes, features and advantages of the present invention, the present invention is further described in detail below with reference to the drawings and the embodiments. It should be noted that, when not conflicting, the embodiments of the present application and features in the embodiments can be combined mutually.

A lot of details are set forth in the below description so as to fully understand the present invention, however, the present invention may also be implemented by adopting other embodiments different from those as described herein, and therefore, scope of the present invention is not limited by the embodiments disclosed below.

Figure 3:
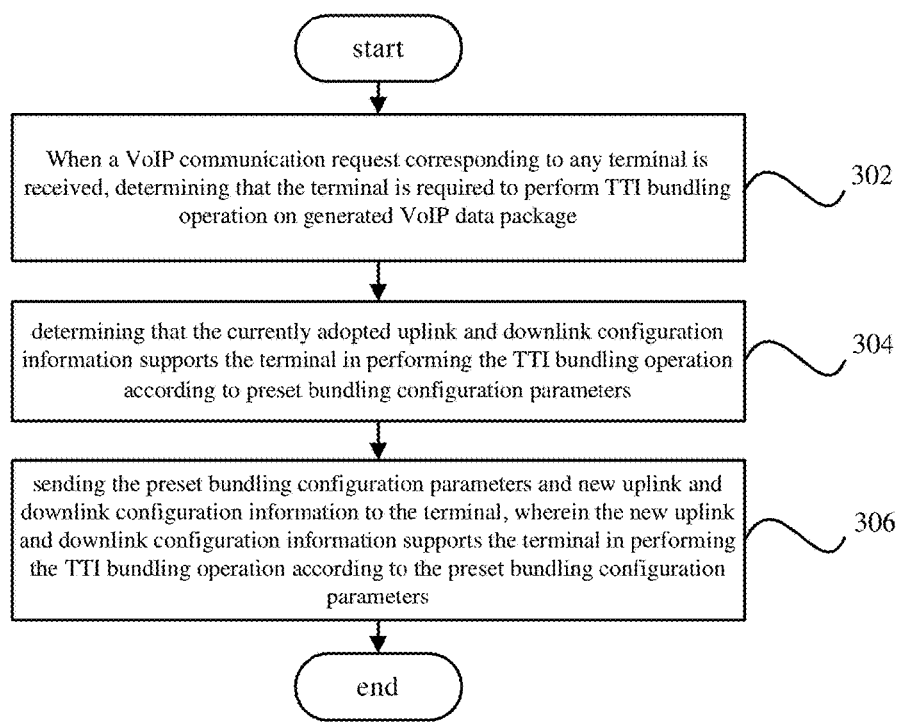
FIG. 3 is a flow chart diagram of transmission method of VoIP data according to an embodiment of the present invention.

FIG. 3 is a flow chart diagram of transmission method of VoIP data according to an embodiment of the present invention.

As shown in FIG. 3, the VoIP data transmission method according to an embodiment of the present invention, comprises:

Step 302 of, when a VoIP communication request corresponding to any terminal is received, performing step 304 if it is determined that the terminal is required to perform TTI bundling operation on generated VoIP data package;

Step 304 of judging whether the currently adopted uplink and downlink configuration information supports the terminal in performing the TTI bundling operation according to preset bundling configuration parameters.

Step 306 of, if not supporting, sending the preset bundling configuration parameters and new uplink and downlink configuration information to the terminal, wherein the new uplink and downlink configuration information supports the terminal in performing the TTI bundling operation according to the preset bundling configuration parameters.

In this technical solution, by judging the support situation of the preset bundling configuration parameters by the currently adopted uplink and downlink configuration information, and when not supporting, changing it into the new uplink and downlink configuration information, the terminal is enabled to perform the TTI bundling operation when applying this new uplink and downlink configuration information, so as to ensure that the VoIP data package can be received smoothly and VoIP communication process is completed.

The preset bundling configuration parameters are the parameters for configuring the TTI bundling operation, such as parameters included in communication standard and implemented by base stations and terminals.

In the above-mentioned technical solution, preferably, the VoIP communication request is from a wireless mobile communication network, or initiated by the terminal.

In this technical solution, for the VoIP communication request from the wireless mobile communication network, namely the call request from other terminals, the wireless mobile communication network is required to initiate the call request to the terminal; for the VoIP communication request initiated by this terminal, the terminal is required to initiate the call request to other terminals. For any communication request, by changing the uplink and downlink configuration information, the terminal is enabled to improve data transmission quality in the VoIP communication process smoothly by the TTI bundling operation.

In any one of the above-mentioned technical solutions, preferably, the preset bundling configuration parameters include TTI bundling quantity, and the VoIP data transmission method comprises determining the currently adopted uplink and downlink configuration information supports the terminal in performing the TTI bundling operation according to the preset bundling configuration parameters if quantity of uplink sub-frames included in a single cycle corresponding to the currently adopted uplink and downlink configuration information is greater than or equal to the TTI bundling quantity, otherwise determining not supporting.

In this technical solution, it is possible to, by presetting the TTI bundling quantity, judge whether it is necessary to change the uplink and downlink configuration information based on whether each kind of the uplink and downlink configuration information supports this TTI bundling quantity. Specifically, each kind of the uplink and downlink configuration information is within a cycle of 10 ms, and the quantity of included uplink sub-frames is constant, and thus it is ensured that the TTI bundling operation can be completed in the case of this TTI bundling quantity, as long as the quantity of uplink sub-frames is greater than or equal to the TTI bundling quantity.

Figure 1:
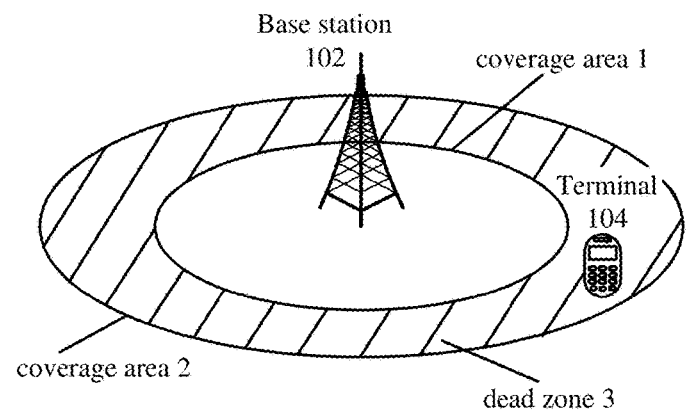
FIG. 1 is a schematic diagram of network coverage situation in related art.
Figure 2:
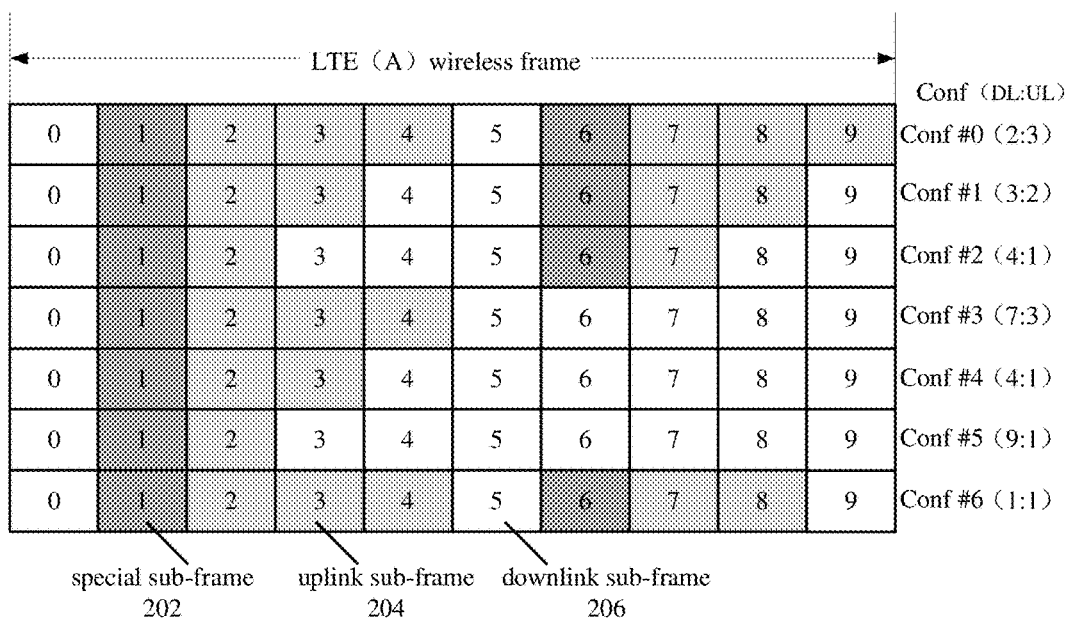
FIG. 2 is a schematic frame structure diagram of the uplink and downlink configuration information in related art.

For example, as shown in FIG. 2, among seven kinds of the currently utilized uplink and downlink configuration information, within a single cycle corresponding to 10 ms, the quantity of uplink sub-frames corresponding to the configurations 0-6 is 6, 4, 2, 3, 2, 1, 5, respectively, and thus it is may be determined that each kind of the bundling quantity is corresponding to the uplink and downlink configuration information that could be supported. For example:

When the bundling quantity is 4, only the configurations 0, 1 and 6 could support the TTI bundling operation; when the bundling quantity is 3, in addition to the configurations 0, 1, 6, the configuration 3 could also support; when the bundling quantity is 2, only the configuration 5 could not support.

Furthermore, on the basis of ensuring the relationship of quantity between the bundling quantity and the quantity of uplink sub-frames, the bundling quantity may be a bundling number or a bundling number group consisting of multiple bundling numbers which will be described in detail below respectively.

Embodiment One: a Bundling Number

In this embodiment, the TTI bundling quantity is one bundling number, indicating that the terminal utilizes this bundling number to perform the bundling operation on the VoIP data package. This bundling number may be any number of 2-6 (corresponding to the specific situation of the quantity of uplink sub-frames included in the uplink and downlink configuration information), and specific TTI bundling operation can be performed with reference to the regulation in current Rel-8 standard agreement regarding the TTI bundling operation in the case that the bundling quantity is 4.

Figure 4A:
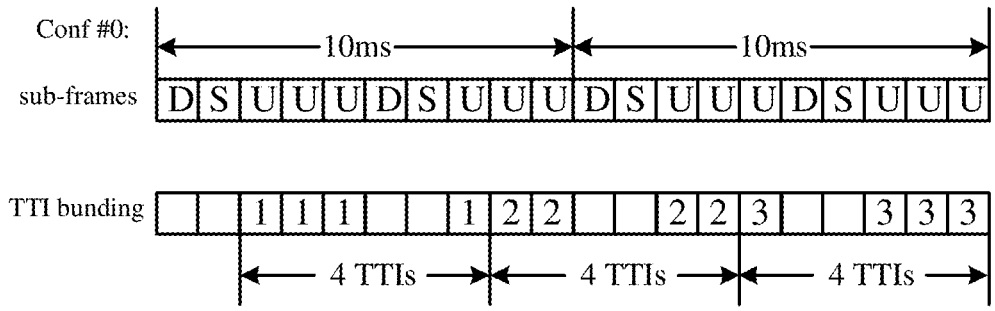
FIG. 4A to 4E are schematic diagrams of frame structure adopting a single bundling number to perform TTI bundling operation according to an embodiment of the present invention.

For example, what is shown in FIG. 4A is the TTI bundling mode corresponding to the configuration 0 when the currently standardized bundling number is 4. The sub-frames the sequence numbers of which are 2, 3, 4 and 7 in the first cycle are corresponding to the first group of TTIs; the sub-frames the sequence numbers of which are 8 and 9 in the first cycle and the sub-frames the sequence numbers of which are 2 and 3 in the second cycle are corresponding to the second group of TTIs; the sub-frames the sequence numbers of which are 4, 7, 8 and 9 in the second cycle are corresponding to the third group of TTIs; in the following cycles, according to the above-mentioned three TTI groups, the TTIs are circularly arranged and bundled.

Figure 4B:
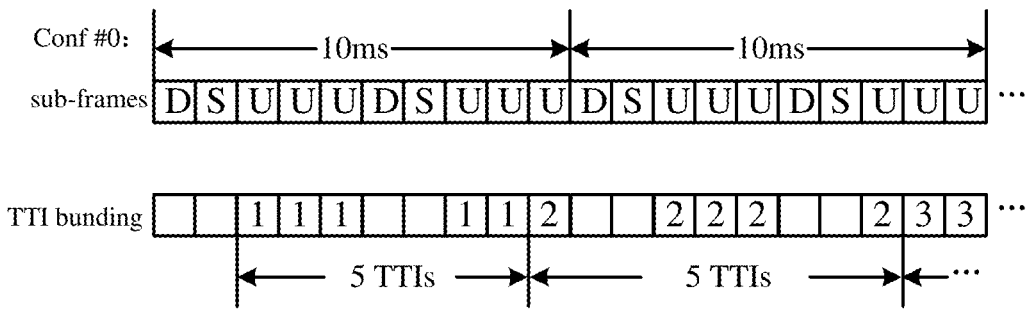
Figure 4C:
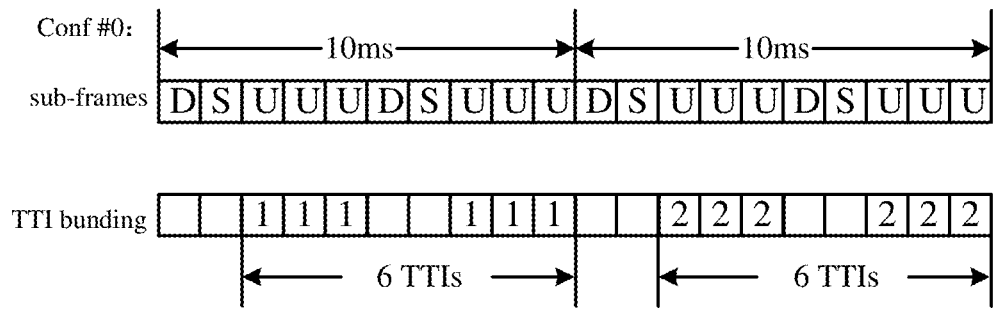

Certainly, obviously, the bundling number may not be 4, namely may also be other number of 2-6. For example, FIG. 4B shows how to realize the bundling to be performed on the TTI in the VoIP data package when the bundling number is 5 in case of the configuration 0; FIG. 4C shows how to realize the bundling to be performed on the TTI in the VoIP data package when the bundling number is 6 in case of the configuration 0.

Figure 4D:
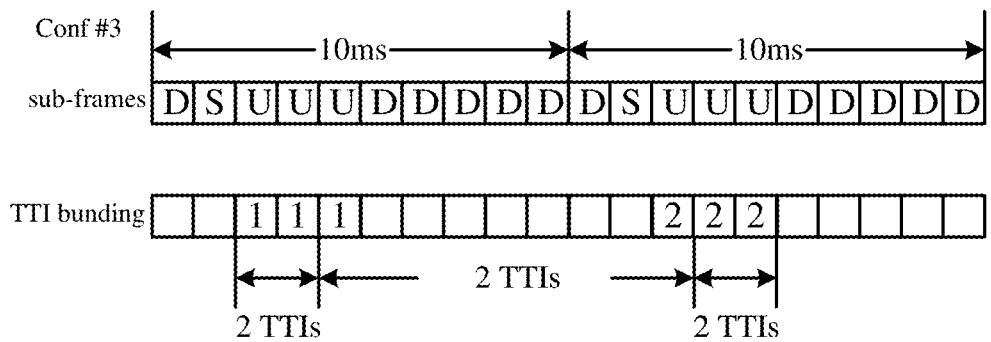
Figure 4E:
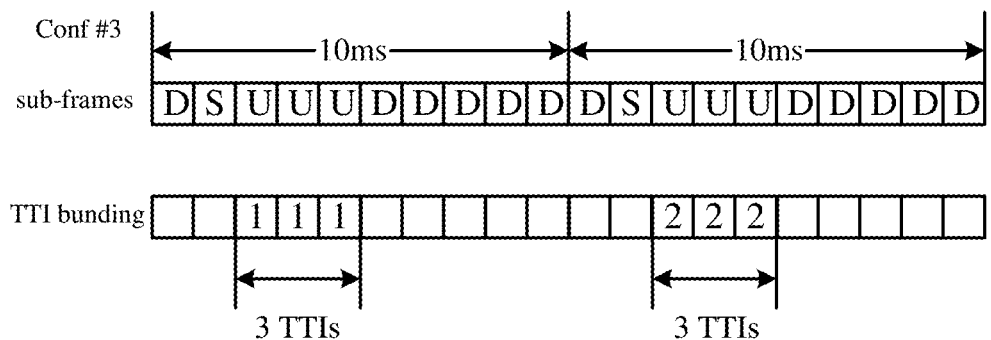

In addition to the configuration 0 including the maximum quantity of uplink sub-frames, with regard to the other uplink and downlink configuration information, the present application also shows specific TTI bundling mode of a part of situation thereof. For example, FIG. 4D shows how to realize the bundling to be performed on the TTI in the VoIP data package when the bundling number is 2 in case of the configuration 3; FIG. 4E shows how to realize the bundling to be performed on the TTI in the VoIP data package when the bundling number is 3 in case of the configuration 3. The TTI bundling modes corresponding to other uplink and downlink configuration information are not described herein.

Embodiment Two: Multiple Bundling Numbers

The TTI bundling quantity is a bundling number group consisting of multiple bundling numbers, indicating that the terminal divides all the TTIs in the VoIP data package into multiple TTI groups according to the bundling number group. Each TTI bundling number in the bundling number group is corresponding to at least one of the multiple TTI groups, and the quantity of TTIs included in each of the multiple TTI groups is equal to the corresponding TTI bundling number.

In the case of including multiple bundling numbers, all these multiple bundling numbers meet the requirement of being less than the quantity of uplink sub-frames included in the uplink and downlink configuration information within a cycle of 10 ms. For these multiple bundling numbers, the TTIs in each VoIP data package are multiple, and thus when these TTIs are divided into groups and packaged, the quantity and the arrangement position of the TTI group corresponding to each bundling number may be realized in multiple ways.

Figure 5A:
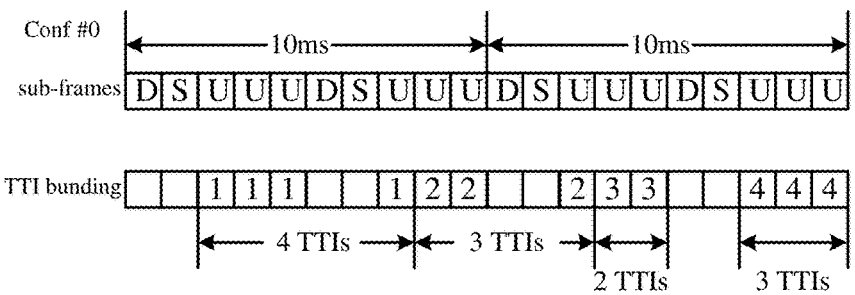
FIGS. 5A and 5B are schematic diagrams of frame structure adopting multiple bundling numbers to perform TTI bundling operation according to an embodiment of the present invention.

The bundling number group {2, 3, 4} is taken as an example and described. As shown in FIG. 5A, in the case of the configuration 0, the sub-frames the sequence numbers of which are 2, 3, 4 and 7 in the first cycle are corresponding to the first group of TTIs, and the 4 included TTIs are corresponding to the bundling number 4; the sub-frames the sequence numbers of which are 8 and 9 in the first cycle and the sub-frame the sequence number of which is 2 in the second cycle are corresponding to the second group of TTIs, the included 3 TTIs corresponding to the bundling number 3; the sub-frames the sequence numbers of which are 3 and 4 in the second cycle are corresponding to the third group of TTIs, the included 2 TTIs corresponding to the bundling number 2; the sub-frames the sequence numbers of which are 7, 8 and 9 in the second cycle are corresponding to the fourth group of TTIs, the included 3 TTIs corresponding to the bundling number 3; in the following cycles, according to the above-mentioned four TTI groups, the TTIs are circularly arranged and bundled.

However, although FIG. 5A shows the specific situation of one kind of TTI bundling operation corresponding to the number group {2, 3, 4}, it is obvious that there may be many other modes of operation.

In an embodiment, the quantity of TTIs in the TTI group corresponding to each bundling number may be adjusted. For example, the 4th group may be adjusted for including two TTIs corresponding to the sub-frames the sequence numbers of which are 7 and 8 respectively in the second cycle, and the remaining TTI is included into the next TTI group.

In another embodiment, the sequence between the multiple TTI groups may be adjusted. For example, the sub-frames the sequence numbers of which are 8 and 9 in the first cycle constitute the second TTI group correspondingly, and the sub-frames the sequence numbers of which are 2, 3 and 4 in the second cycle constitute the third TTI group correspondingly, which is equivalent to exchanging the sequence of the second and the third TTI groups as shown in FIG. 5A.

The bundling number in the bundling number group may also be less, for example 2. Specifically, taking a number group {2, 3} for example, assuming that there are 20 TTIs (not shown) in total, in one kind of mode, it is possible to be bundled into 7 TTI groups, one of the TTI groups including 2 TTIs, the remaining 6 TTI groups including 3 TTIs each; in another kind of mode, it is possible to be bundled into 8 TTI groups, 4 of the TTI groups including 2 TTIs each, the remaining 4 TTI groups including 3 TTIs each; in yet another kind of mode, it is possible to be bundled into 9 TTI groups, 7 of the TTI groups including 2 TTIs each, the remaining 2 TTI groups including 3 TTIs each.

Moreover, with regard to the above-mentioned each kind of grouping, there are also multiple situations among the arrangement sequence of multiple TTI groups. For example, taking the above-mentioned 7 TTI groups in total as an example, the TTI group including 2 TTIs and the remaining 6 TTI groups may constitute 7 kinds of different combination modes, such as (2, 3, 3, 3, 3, 3, 3), (3, 2, 3, 3, 3, 3, 3), (3, 3, 2, 3, 3, 3, 3), (3, 3, 3, 2, 3, 3, 3), (3, 3, 3, 3, 2, 3, 3), (3, 3, 3, 3, 3, 2, 3), (3, 3, 3, 3, 3, 3, 2) etc.

Figure 5B:
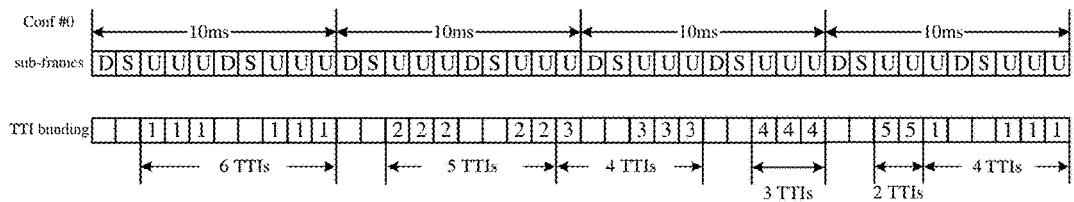

The bundling number in the bundling number group may also be more, such as 5. Specifically, FIG. 5B shows a kind of specific situation of performing TTI bundling operation according to the number group {2, 3, 4, 5, 6}. The sub-frames the sequence numbers of which are 2, 3, 4, 7, 8 and 9 in the first cycle are corresponding to the first group of TTIs; the sub-frames the sequence numbers of which are 2, 3, 4, 7 and 8 in the second cycle are corresponding to the second group of TTIs; the sub-frame the sequence number of which is 9 in the second cycle and the sub-frames the sequence numbers of which are 2, 3 and 4 in the third cycle are corresponding to the third group of TTIs; the sub-frames the sequence numbers of which are 7, 8 and 9 in the third cycle are corresponding to the fourth group of TTIs; the sub-frames the sequence numbers of which are 2 and 3 in the fourth cycle are corresponding to the fifth group of TTIs; the sub-frames the sequence numbers of which are 4, 7, 8 and 9 in the fourth cycle are corresponding to the sixth group of TTIs; In the following cycles, according to the above-mentioned six TTI groups, the TTIs are circularly arranged and bundled.

Therefore, in the case of including multiple bundling numbers, it is possible to determine which specific kind of combination mode to use by bringing it into the communication standard in advance or make an agreement between the terminal and the base station, so as to perform smoothly when implementing practically. Certainly, the terminal may also directly generate a group of random numbers from these multiple bundling numbers, and perform the bundling operation on the TTI in the VoIP data package according to this group of random numbers.

In any one of the above-mentioned technical solutions, preferably, the generating cycle length of the VoIP data package is corresponding to multiple cycles of the currently adopted uplink and downlink configuration information, and the quantity of all the uplink sub-frames included in the multiple cycles is greater than or equal to the quantity of all the TTIs in the VoIP data package.

In this technical solution, as the VoIP data package has corresponding generating cycle, for example 20 ms, this time section is corresponding in multiple cycles of the uplink and downlink configuration information, and sufficient quantity of uplink sub-frames ought to be comprised, to avoid the collision between multiple packages generated in the same VoIP process operated in the terminal.

In any one of the above-mentioned technical solutions, preferably, the preset bundling configuration parameters further include Round Trip Time and/or HARQ (Hybrid Automatic Repeat Request) sequence. The Round Trip Time (RTT) refers to the repeating cycle corresponding to the each VoIP data package, and the HARQ sequence refers to ACK feedback sub-frame corresponding to the each data package, or NACK feedback sub-frame and retransmitted sub-frame number corresponding to the each data package.

Certainly, the RTT and/or the HARQ sequence may be added in a certain signaling, and sent together with the TTI bundling number, or they may also be sent separately by other signalings, for example, the RTT being sent by signaling 1, and the HARQ sequence being sent by signaling 2, or the RTT and the HARQ sequence together being sent by signaling 3.

In any one of the above-mentioned technical solutions, it is preferable to further comprise: obtaining channel quality parameter corresponding to the terminal; and determining that the terminal is required to perform the TTI bundling operation on the VoIP data, if the value of the channel quality parameter is less than or equal to preset parameter threshold.

In this technical solution, by obtaining the channel quality (indicated by value of the channel quality parameter) corresponding to the terminal, it may be determined that the TTI bundling operation is required to be performed so as to ensure the smooth performance of the VoIP communications, when this channel quality is relatively worse (manifesting that the value of the channel quality parameter is less than or equal to the preset parameter threshold).

In any one of the above-mentioned technical solutions, preferably, the process of obtaining the channel quality parameter corresponding to the terminal comprises measuring reference signal sent by the terminal so as to obtain the channel quality parameter; or receiving downlink measuring report uploaded by the terminal, and obtaining the channel quality parameter from the downlink measuring report.

In this technical solution, two detailed described methods of obtaining the channel quality parameter are provided, however, persons skilled in the art should understand that, it is only illustration herein, and apparently obtaining the channel quality is not limited to these two above methods.

In any one of the above-mentioned technical solutions, it is preferable to further comprise estimating whether the changed value of the channel quality parameter meets the requirement of being greater than the preset parameter threshold after performing the TTI bundling operation according to the preset bundling configuration parameter, if the currently adopted uplink and downlink configuration information supports the TTI bundling operation performed by the terminal according to the preset bundling configuration parameters; if not meeting, sending the preset bundling configuration parameters and the new uplink and downlink configuration information to the terminal.

In this technical solution, in the case that the uplink and downlink configuration information supports the preset bundling configuration parameters, for example, the preset bundling configuration parameter being 2, and the currently adopted uplink and downlink configuration information being configuration 2, although the TTI bundling operation can be performed, the gain brought thereby does not necessarily enable the terminal to complete the VoIP communication smoothly. Therefore, by estimating the situation after the TTI bundling operation is completed, it is possible to truly ensure that the sufficient gain could be brought for the terminal after the TTI bundling operation is completed, so as to improve the channel quality and complete the VoIP communication smoothly.

In any one of the above-mentioned technical solutions, it is preferable to, before sending the preset bundling configuration parameter and the new uplink and downlink configuration information to the terminal, further comprise choosing an uplink and downlink configuration information which is different from the currently adopted uplink and downlink configuration information; and estimating whether the changed value of the channel quality parameter meets the requirement of being greater than the preset parameter threshold after the terminal performs the TTI bundling operation according to the preset bundling configuration parameter, when the chosen uplink and downlink configuration information is applied; if meeting, regarding the chosen uplink and downlink configuration information as the new uplink and downlink configuration information, otherwise performing the choosing operation again.

In this technical solution, because after performing the TTI bundling operation, the gain sufficient for the terminal to complete the VoIP communication smoothly may not be definitely brought, by estimating the channel quality corresponding to the currently chosen uplink and downlink configuration information, suitable uplink and downlink configuration information can be chosen, such that after the TTI bundling operation is completed, it is possible to truly ensure that sufficient gain is brought for the terminal, to improve the channel quality and complete the VoIP communication smoothly.

Figure 6:
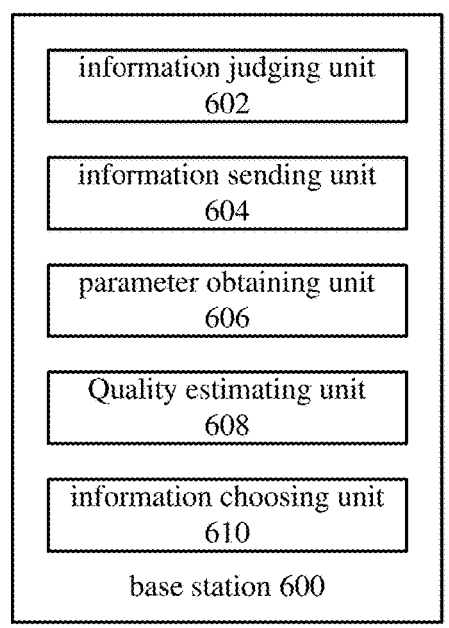
FIG. 6 is a schematic block diagram of a base station according to an embodiment of the present invention.

FIG. 6 is a schematic block diagram of a base station according to an embodiment of the invention.

As shown in FIG. 6, a base station 600 according to an embodiment of the invention, comprises an information judging unit 602 for judging whether the currently adopted uplink and downlink configuration information supports the terminal in performing the TTI bundling operation according to the preset bundling configuration parameters if determining the terminal is required to perform the TTI bundling operation on the generated VoIP data package, in the case of receiving the VoIP communication request corresponding to any terminal; and an information sending unit 604, for sending the preset bundling configuration parameter and the new uplink and downlink configuration information to the terminal in the case of determining not supporting, wherein the new uplink and downlink configuration information supports the terminal in performing the TTI bundling operation according to the preset bundling configuration parameters.

In this technical solution, by judging the situation of supporting the preset bundling configuration parameters by the currently adopted uplink and downlink configuration information, and when not supporting, changing it into the new uplink and downlink configuration information, the terminal is enabled to perform the TTI bundling operation when applying this new uplink and downlink configuration information, so as to ensure that the VoIP data package can be received smoothly and the VoIP communication process is completed.

The preset bundling configuration parameters are the parameters for configuring the TTI bundling operation, such as parameters included in communication standard and implemented by base stations and terminals.

In the above-mentioned technical solution, preferably, the VoIP communication request is from the wireless mobile communication network, or initiated by the terminal.

In this technical solution, for the VoIP communication request from the wireless mobile communication network, namely the call request from other terminals, the wireless mobile communication network is required to initiate the call request to the terminal; for the VoIP communication request initiated by this terminal, the terminal is required to initiate the call request to other terminals. For any communication request, by changing the uplink and downlink configuration information, the terminal is enabled to improve the data transmission quality in the VoIP communication process smoothly by the TTI bundling operation.

In any one of the above-mentioned technical solutions, preferably, the preset bundling configuration parameters include the TTI bundling quantity, and the information judging unit 602 is for determining the currently adopted uplink and downlink configuration information supports the terminal in performing the TTI bundling operation according to the preset bundling configuration parameters in the case that the quantity of uplink sub-frames included in a single cycle corresponding to the currently adopted uplink and downlink configuration information is greater than or equal to the TTI bundling quantity, otherwise determining not supporting.

In this technical solution, it is possible to, by presetting the TTI bundling quantity, judge whether it is necessary to change the uplink and downlink configuration information based on whether each kind of the uplink and downlink configuration information supports this TTI bundling quantity. Specifically, each kind of the uplink and downlink configuration information is within a cycle of 10 ms, and the quantity of included uplink sub-frames is constant, and thus as long as the quantity of uplink sub-frames is more than or equal to the TTI bundling quantity, it is ensured that the TTI bundling operation can be completed in the case of this TTI bundling quantity.

For example, when the bundling quantity is 4, only the configurations 0, 1 and 6 could support the TTI bundling operation; when the bundling quantity is 3, in addition to the configurations 0, 1, 6, the configuration 3 could also support; when the bundling quantity is 2, only the configuration 5 could not support.

In any one of the above-mentioned technical solutions, preferably, the TTI bundling quantity is one bundling number, indicating that the terminal utilizes this bundling number to perform the bundling operation on the VoIP data package; or the TTI bundling quantity is a bundling number group consisting of multiple bundling numbers, indicating that the terminal divides all the TTIs in the VoIP data package into multiple TTI groups according to the bundling number group, each TTI bundling number in the bundling number group being corresponding to at least one of the multiple TTI groups, the quantity of TTIs included in each of the multiple TTI groups being equal to the corresponding TTI bundling number.

In this technical solution, in the case of including only one bundling number, this bundling number may be any number of 2-6, and specific TTI bundling operation can be performed with reference to the regulation in current Rel-8 standard agreement regarding the TTI bundling operation in the case that the bundling quantity is 4.

In the case of including multiple bundling numbers, all these multiple bundling numbers meet the requirement of being less than the quantity of uplink sub-frames included in the uplink and downlink configuration information within a cycle of 10 ms. For these multiple bundling numbers, the TTIs in each VoIP data package are multiple, and thus when these TTIs are divided into groups and packaged, the quantity and the arrangement position of the TTI group corresponding to each bundling number may be realized in multiple ways.

For example, in the case of the number group {2, 3}, assuming that there are 20 TTIs in total, in one kind of mode, it is possible to be bundled into 7 TTI groups, one of the TTI groups including 2 TTIs, the remaining 6 TTI groups including 3 TTIs each; in another kind of mode, it is possible to be bundled into 8 TTI groups, 4 of the TTI groups including 2 TTIs each, the remaining 4 TTI groups including 3 TTIs each; in yet another kind of mode, it is possible to be bundled into 9 TTI groups, 7 of the TTI groups including 2 TTIs each, the remaining 2 TTI groups including 3 TTIs each.

Moreover, with regard to the above-mentioned each kind of grouping, there are also multiple situations among the arrangement sequence of multiple TTI groups. For example, taking the above-mentioned 7 TTI groups in total as an example, the TTI group including 2 TTIs and the remaining 6 TTI groups may constitute 7 kinds of different combination modes, such as (2, 3, 3, 3, 3, 3, 3), (3, 2, 3, 3, 3, 3, 3), (3, 3, 2, 3, 3, 3, 3), (3, 3, 3, 2, 3, 3, 3), (3, 3, 3, 3, 2, 3, 3), (3, 3, 3, 3, 3, 2, 3), (3, 3, 3, 3, 3, 3, 2) etc.

Therefore, in the case of including multiple bundling numbers, it is possible to determine which specific kind of combination mode to use by bringing it into the communication standard in advance or making an agreement between the terminal and the base station, so as to perform smoothly when implementing practically. Certainly, the terminal may also directly generate a group of random numbers from these multiple bundling numbers, and perform the bundling operation on the TTI in the VoIP data package according to this group of random numbers.

In any one of the above-mentioned technical solutions, preferably, the generating cycle length of the VoIP data package is corresponding to multiple cycles of the currently adopted uplink and downlink configuration information, and the quantity of all the uplink sub-frames included in the multiple cycles is greater than or equal to the quantity of all the TTIs in the VoIP data package.

In this technical solution, as the VoIP data package has corresponding generating cycle, for example 20 ms, this time section is corresponding within multiple cycles of the uplink and downlink configuration information, and sufficient quantity of uplink sub-frames ought to be included, to avoid the collision between multiple packages generated in the same VoIP process operated in the terminal.

In any one of the above-mentioned technical solutions, preferably, the preset bundling configuration parameters further include Round Trip Time and/or HARQ (Hybrid Automatic Repeat Request) sequence. The Round Trip Time (RTT) refers to the repeating cycle corresponding to the each VoIP data package, and the HARQ sequence refers to ACK feedback sub-frame corresponding to the each data package, or NACK feedback sub-frame and retransmitted sub-frame number corresponding to the each data package.

Certainly, the RTT and/or the HARQ sequence may be added in a certain signaling, and sent together with the TTI bundling number, or they may also be sent separately by other signalings, for example, the RTT being sent by signaling 1, and the HARQ sequence being sent by signaling 2, or the RTT and the HARQ sequence together being sent by signaling 3.

In any one of the above-mentioned technical solutions, it is preferable to further comprise a parameter obtaining unit 606 for obtaining the channel quality parameter corresponding to the terminal, wherein the information judging unit 602 determines that the terminal is required to perform the TTI bundling operation on the VoIP data, if the value of the channel quality parameter is less than or equal to preset parameter threshold.

In this technical solution, by obtaining the channel quality (indicated by the value of the channel quality parameter) corresponding to the terminal, it may be determined that the TTI bundling operation is required to be performed so as to ensure the smooth performance of the VoIP communications, when this channel quality is relatively worse (manifesting that the value of the channel quality parameter is less than or equal to the preset parameter threshold).

In any one of the above-mentioned technical solutions, preferably, the parameter obtaining unit 606 is for measuring reference signal sent by the terminal so as to obtain the channel quality parameter; or receiving downlink measuring report uploaded by the terminal, and obtaining the channel quality parameter from the downlink measuring report.

In this technical solution, two detailed described methods of obtaining the channel quality parameter are provided, however, persons skilled in the art should understand that, it is only illustration herein, and apparently obtaining the channel quality is not limited to these two above methods.

In any one of the above-mentioned technical solutions, it is preferable to further comprise a quality estimating unit 608 for estimating whether the changed value of the channel quality parameter meets the requirement of being greater than the preset parameter threshold after the terminal performs the TTI bundling operation according to the preset bundling configuration parameter, if the currently adopted uplink and downlink configuration information supports the TTI bundling operation performed according to the preset bundling configuration parameters, wherein if the estimation result is not meeting, the information sending unit 604 sends the preset bundling configuration parameters and the new uplink and downlink configuration information to the terminal.

In this technical solution, in the case that the uplink and downlink configuration information supports the preset bundling configuration parameters, for example, the preset bundling configuration parameter being 2, and the currently adopted uplink and downlink configuration information being the configuration 2, although the TTI bundling operation can be performed, the gain brought thereby does not necessarily enable the terminal to complete the VoIP communication smoothly. Therefore, by estimating the situation after the TTI bundling operation is completed, it is possible to truly ensure that the sufficient gain could be brought for the terminal after the TTI bundling operation is completed, so as to improve the channel quality and complete the VoIP communication smoothly.

In any one of the above-mentioned technical solutions, it is preferable to further comprise an information choosing unit 610 for, before sending the preset bundling configuration parameters and the new uplink and downlink configuration information to the terminal, choosing an uplink and downlink configuration information which is different from the currently adopted uplink and downlink configuration information; and a quality estimating unit 608 for estimating whether the changed value of the channel quality parameter meets the requirement of being greater than the preset parameter threshold after the terminal performs the TTI bundling operation according to the preset bundling configuration parameters, when the chosen uplink and downlink configuration information is applied, wherein if the estimation result is meeting, the information choosing unit 610 regards the chosen uplink and downlink configuration information as the new uplink and downlink configuration information, otherwise performs the choosing operation again.

In this technical solution, because after performing the TTI bundling operation, the gain sufficient for the terminal to complete the VoIP communication smoothly may not be definitely brought, by estimating the channel quality corresponding to the currently chosen uplink and downlink configuration information, suitable uplink and downlink configuration information can be chosen, such that after the TTI bundling operation is completed, it is possible to truly ensure that sufficient gain is brought for the terminal, to improve the channel quality and complete the VoIP communication smoothly.

Figure 7:
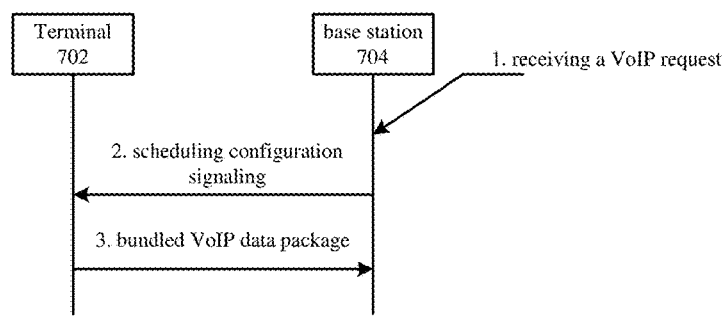
FIG. 7 is a schematic diagram of performing interaction configuration between a base station and a terminal according to an embodiment of the present invention.

FIG. 7 is a schematic diagram of performing interaction configuration between a base station and a terminal according to an embodiment of the present invention.

As shown in FIG. 7, the process of performing the interaction configuration between a base station and a terminal according to an embodiment of the present invention includes the following steps.

Step 1 is receiving, by a base station 704, a VoIP request.

Specifically, this request may be from the wireless mobile communication network, for initiating the VoIP communication to the terminal 702; or, this request may be from the terminal 702, for initiating the VoIP communication to other wireless communication equipments.

The base station 704 is required to determine the situation of parameters e.g. SINR with regard to the terminal 702, so as to determine the situation of the channel quality between the base station 704 and the terminal 702. Specifically, the base station 704 may, By configuring SRS (Sounding Reference Signal) and when the terminal 702 sends SRS to the base station 704, measuring it, so as to obtain SINR or other parameters.

By receiving downlink measuring report sent by the terminal 702, determining SINR or other parameters based on channel reciprocity.

Taking SINR as an example, if less than preset threshold, it will be determined that the TTI bundling operation is required to be performed.

The base station 704 is required to obtain the currently adopted uplink and downlink configuration information, so as to judge whether supporting the TTI bundling operation. For example, having preset the TTI bundling quantity to be 4, in the case of configurations 0, 1 or 6, it may be directly determined that the TTI bundling operation could be performed; in the case of other configurations, the TTI bundling operation could not be performed, and then the base station 704 is required to generate scheduling configuration signaling with the new uplink and downlink configuration information (such as the configurations 0, 1 or 6) and the TTI bundling configuration information (for example the TTI bundles quantity is 4) included therein.

Step 2 is sending scheduling configuration signaling to a terminal 702.

Step 3 is performing, by the terminal 702, bundling operation on VoIP data package based on this scheduling configuration signaling, and then sending the VoIP data package to the base station 704.

Certainly, the TTI bundling quantity may also be other numbers, such as 3, and then in addition to the configurations 0, 1, 6, the configuration 3 may also support the TTI bundling operation, and thus in the case that the currently adopted uplink and downlink configuration information is just 3, it may be unnecessary to adjust the uplink and downlink configuration information, so as to avoid the situation of causing cross interference with adjacent cells.

In addition, in the case that the current uplink and downlink configuration information could support the TTI bundling operation, the situation of the gain which could be achieved thereby is still required to be estimated, such that after performing the TTI bundling operation, SINR corresponding to the terminal 702 could be truly improved.

As for specific estimating methods, there may be multiple kinds. Several of these methods are taken as examples and described hereinafter.

By methods such as measurement, simulation, etc., a table of the channel quality gain which could be brought by each kind of combination modes of different uplink and downlink configuration information and TTI bundling numbers, is built beforehand. If the currently adopted uplink and downlink configuration information does not support the TTI bundling operation, a new uplink and downlink configuration information is determined, and whether sufficient gain could be brought is judged by checking the table; if supporting, corresponding scheduling configuration signaling is generated, otherwise another uplink and downlink configuration information is changed into, and the judgment is continued.

Certain uplink and downlink configuration information is determined in real time, and by tentatively changing and measuring, the gain which could be brought thereby is determined in real time. If the gain is sufficient, corresponding scheduling configuration signaling is generated, otherwise another uplink and downlink configuration information is changed into, and the judgment is continued.

Certainly, in the scheduling configuration signaling, it is possible to only include new uplink and downlink configuration information; Also, it is possible to include one group of uplink and downlink configuration information, such as new uplink and downlink configuration information and current uplink and downlink configuration information. As for the former, it is advantageous for avoiding the frequent variation of the uplink and downlink configuration information, and preventing the cross interference between cells; as for the latter, it is possible to reduce the impact on downlink data speed while ensuring that the signal to noise ratio of VoIP is increased.

And, because the purpose of changing the uplink and downlink configuration information is to support the VoIP process, in order to reduce the expense of the scheduling configuration signaling, it is possible to increase by one activation cycle, that is to say, if there is no new scheduling configuration signaling within this activation cycle, the changed uplink and downlink configuration information is always valid; after exceeding the activation cycle, the base station 704 may make the terminal 702 keep the new configuration, or recover to the original configuration.

Hereinbefore, the technical solution of the present invention is explained in detail in conjunction with the drawings. The present invention proposes a VoIP data transmission method and a base station which, by dynamically adjusting the uplink and downlink configuration information in the case that the TTI bundling is required to be performed and the currently adopted uplink and downlink configuration information does not support the TTI bundling, may ensure that the terminal could perform the TTI bundling operation so as to contribute to improving the VoIP communication quality for users at cell edge.

The foregoing is only the preferred embodiments of the present invention, and is not for limiting the present invention. For persons skilled in the art, the present invention could have various modifications and variations. Any amendment, equivalent, or improvement etc. within the spirit and principle of the present invention should be included within the protection scope of the present invention.

What is claimed is:

1. A VoIP data transmission method, comprising:
    when a VoIP communication request corresponding to any terminal is received, determining whether currently adopted uplink and downlink configuration information supports the terminal in performing TTI bundling operation according to preset bundling configuration parameters based on a determination that the terminal is required to perform the TTI bundling operation on generated VoIP data package; and
    when the currently adopted uplink and downlink configuration information does not support the terminal in performing the TTI bundling operation according to the preset bundling configuration parameters, sending the preset bundling configuration parameters and new uplink and downlink configuration information to the terminal, wherein the new uplink and downlink configuration information supports the terminal in performing the TTI bundling operation according to the preset bundling configuration parameters.

2. The VoIP data transmission method according to claim 1, wherein the VoIP communication request is sent from a wireless mobile communication network, or initiated by the terminal.

3. The VoIP data transmission method according to claim 1, wherein the preset bundling configuration parameters include TTI bundling quantity, further comprising:
    determining the currently adopted uplink and downlink configuration information supports the terminal in performing the TTI bundling operation according to the preset bundling configuration parameters when quantity of uplink sub-frames included in a single cycle corresponding to the currently adopted uplink and downlink configuration information is greater than or equal to the TTI bundling quantity; otherwise, determining the currently adopted uplink and downlink configuration information does not support the terminal in performing the TTI bundling operation according to the preset bundling configuration parameters.

4. The VoIP data transmission method according to claim 3, wherein:
    the TTI bundling quantity is one bundling number, indicating that the terminal utilizes this bundling number to perform the bundling operation on the VoIP data package;
    or the TTI bundling quantity is a bundling number group consisting of multiple bundling numbers, indicating that the terminal divides all the TTIs in the VoIP data package into multiple TTI groups according to the bundling number group, each TTI bundling number in the bundling number group being corresponding to at least one of the multiple TTI groups, the quantity of TTIs included in each of the multiple TTI groups being equal to the corresponding TTI bundling number.

5. The VoIP data transmission method according to claim 3, wherein the generating cycle length of the VoIP data package is corresponding to multiple cycles of the currently adopted uplink and downlink configuration information, and the quantity of all the uplink sub-frames included in the multiple cycles is greater than or equal to the quantity of all the TTIs in the VoIP data package.

6. The VoIP data transmission method according to claim 3, wherein the preset bundling configuration parameters further include Round Trip Time and/or HARQ (Hybrid Automatic Repeat Request) sequence,
    wherein the Round Trip Time refers to a repeating cycle corresponding to the each VoIP data package;
    the HARQ sequence comprises ACK feedback sub-frame corresponding to the each data package, or NACK feedback sub-frame and retransmitted sub-frame number corresponding to the each data package.

7. The VoIP data transmission method according to claim 1, further comprising:
    obtaining channel quality parameter corresponding to the terminal; and
    determining that the terminal is required to perform the TTI bundling operation on the VoIP data, when the value of the channel quality parameter is less than or equal to preset parameter threshold.

8. The VoIP data transmission method according to claim 7, wherein the process of obtaining the channel quality parameter corresponding to the terminal comprises:
    measuring reference signal sent by the terminal so as to obtain the channel quality parameter;
    or receiving downlink measuring report uploaded by the terminal, and obtaining the channel quality parameter from the downlink measuring report.

9. The VoIP data transmission method according to claim 7, further comprising:
    estimating whether changed value of the channel quality parameter meets a requirement of being greater than the preset parameter threshold after performing the TTI bundling operation according to the preset bundling configuration parameter, when the currently adopted uplink and downlink configuration information supports the TTI bundling operation performed by the terminal according to the preset bundling configuration parameters;

when the changed value of the channel quality parameter does not meet the requirement of being greater than the preset parameter threshold, sending the preset bundling configuration parameters and the new uplink and downlink configuration information to the terminal.

10. The VoIP data transmission method according to claim 7, wherein before sending the preset bundling configuration parameters and the new uplink and downlink configuration information to the terminal, further comprising:
choosing an uplink and downlink configuration information different from the currently adopted uplink and downlink configuration information; and
estimating whether the changed value of the channel quality parameter meets the requirement of being greater than the preset parameter threshold after the terminal performs the TTI bundling operation according to the preset bundling configuration parameters, when the chosen uplink and downlink configuration information is applied;
when the changed value of the channel quality parameter meets a requirement of being greater than the preset parameter threshold, determining the chosen uplink and downlink configuration information as the new uplink and downlink configuration information, otherwise performing the choosing operation again.

11. A base station, comprising:
an information judging unit, for determining whether currently adopted uplink and downlink configuration information supports a terminal in performing TTI bundling operation according to preset bundling configuration parameters based on a determination that the terminal is required to perform the TTI bundling operation on generated VoIP data package, in the case of receiving a VoIP communication request corresponding to any terminal; and
an information sending unit, for sending the preset bundling configuration parameters and new uplink and downlink configuration information to the terminal in the case of determining that the currently adopted uplink and downlink configuration information does not support the terminal in performing the TTI bundling operation according to the preset bundling configuration parameters, wherein the new uplink and downlink configuration information supports the terminal in performing the TTI bundling operation according to the preset bundling configuration parameters.

12. A base station according to claim 11, wherein the VoIP communication request is sent from a wireless mobile communication network, or initiated by the terminal.

13. A base station according to claim 11, wherein the preset bundling configuration parameters include TTI bundling quantity, and
the information judging unit is for determining the currently adopted uplink and downlink configuration information supports the terminal in performing the TTI bundling operation according to the preset bundling configuration parameters in the case that quantity of uplink sub-frames included in a single cycle corresponding to the currently adopted uplink and downlink configuration information is greater than or equal to the TTI bundling quantity, and otherwise determining the currently adopted uplink and downlink configuration information does not support the terminal in performing the TTI bundling operation according to the preset bundling configuration parameters.

14. A base station according to claim 13, wherein
the TTI bundling quantity is one bundling number, indicating that the terminal utilizes this bundling number to perform the bundling operation on the VoIP data package;
or the TTI bundling quantity is a bundling number group consisting of multiple bundling numbers, indicating that the terminal divides all the TTIs in the VoIP data package into multiple TTI groups according to the bundling number group, each TTI bundling number in the bundling number group being corresponding to at least one of the multiple TTI groups, the quantity of TTIs included in each of the multiple TTI groups being equal to the corresponding TTI bundling number.

15. A base station according to claim 13, wherein
the generating cycle length of the VoIP data package is corresponding to multiple cycles of the currently adopted uplink and downlink configuration information, and the quantity of all the uplink sub-frames included in the multiple cycles is greater than or equal to the quantity of all the TTIs in the VoIP data package.

16. A base station according to claim 13, wherein
the preset bundling configuration parameters further include at least one of Round Trip Time or HARQ (Hybrid Automatic Repeat Request) sequence;
Wherein the Round Trip Time comprises the repeating cycle corresponding to the each VoIP data package; and
the HARQ sequence refers to ACK feedback sub-frame corresponding to the each data package, or NACK feedback sub-frame and retransmitted sub-frame number corresponding to the each data package.

17. A base station according to claim 11, further comprising a parameter obtaining unit for obtaining channel quality parameter corresponding to the terminal,
wherein the information judging unit determines that the terminal is required to perform the TTI bundling operation on the VoIP data, when the value of the channel quality parameter is less than or equal to preset parameter threshold.

18. A base station according to claim 16, wherein the parameter obtaining unit is for measuring the reference signal sent by the terminal so as to obtain the channel quality parameter; or receiving downlink measuring report uploaded by the terminal, and obtaining the channel quality parameter from the downlink measuring report.

19. A base station according to claim 16, further comprising a quality estimating unit for estimating whether the changed value of the channel quality parameter meets the requirement of being greater than the preset parameter threshold after the terminal performs the TTI bundling operation according to the preset bundling configuration parameter, when the currently adopted uplink and downlink configuration information supports the TTI bundling operation performed according to the preset bundling configuration parameters,
wherein when the estimation result is not met, the information sending unit sends the preset bundling configuration parameters and the new uplink and downlink configuration information to the terminal.

20. A base station according to claim 16, further comprising:
an information choosing unit for, before sending the preset bundling configuration parameters and the new uplink and downlink configuration information to the terminal, choosing an uplink and downlink configuration information which is different from the currently adopted uplink and downlink configuration information; and a quality estimating unit for estimating whether the changed value of the channel quality parameter meets the requirement of being greater than the preset parameter threshold after the terminal performs the TTI bundling operation according to the preset bundling configuration parameters, when the chosen uplink and downlink configuration information is applied;

wherein when the estimation result is meeting, the information choosing unit regards the chosen uplink and downlink configuration information as the new uplink and downlink configuration information, otherwise performs the choosing operation again.

\* \* \* \* \*